United States Patent [19]

Lidington

[11] 3,779,598

[45] Dec. 18, 1973

[54] SLIDING ROOFS AND VEHICLES

[75] Inventor: Frederick Charles Lidington, Birmingham, England

[73] Assignee: Weathershields Limited, Birmingham, England

[22] Filed: May 4, 1972

[21] Appl. No.: 250,275

[30] Foreign Application Priority Data

Feb. 10, 1972 Great Britain .................... 6,180/72

[52] U.S. Cl. ......................... 296/137 G, 296/137 H

[51] Int. Cl. ............................................ B60j 7/10

[58] Field of Search .................... 296/137 G, 137 E, 296/137 F, 137 H

[56] References Cited

UNITED STATES PATENTS 3,372,954 3/1968 Castelet ......................... 296/137 H

FOREIGN PATENTS OR APPLICATIONS 1,030,736 5/1966 Great Britain ................. 296/137 E

*Primary Examiner*—Robert R. Song
*Attorney*—Samuel Scrivener, Jr. et al.

[57] ABSTRACT

In a vehicle sliding roof incorporating a longitudinally sliding panel for closing an opening in the front part of the roof, a stationary longitudinal rod or bar located under the rear fixed part of the roof extends through a housing mounted on the panel at its rear end. A pair of transverse locking members mounted in the housing are restrained at one pair of adjacent ends against movement with respect to the housing by abutment means in the housing. The locking members are provided with openings through which the rod or bar is passed and at least portions of the locking members containing the openings are normally urged resiliently into operative positions in which they are oppositely inclined with respect to, and lock onto, the rod or bar to prevent relative movement of the panel with respect to the rod or bar only in each of two opposite directions. The engagements between the locking members and the rod or bar are adapted to be released by longitudinal movement of a longitudinal transmission member which is guided in the housing for limited longitudinal movement in a fore and aft direction in response to corresponding movement of a finger-operated control mounted in the panel.

4 Claims, 4 Drawing Figures

4 33 34 3 31 2 9

32

SLIDING ROOFS AND VEHICLES

SPECIFIC DESCRIPTION

This invention relates to improvements in sliding roofs for vehicles of the kind in which an opening in the front part of the roof is adapted to be closed by a longitudinally sliding panel which, when opened, slides rearwardly under the fixed rear part of the roof and when in the closed position is flush with the surface of the roof so that its presence is not obvious.

Our invention is concerned particularly with means for actuating the sliding roof and for locking it in any desired position.

In the specification of our U.S. Pat. No. 1,030,736 we have described and claimed a sliding roof of the kind set forth in which a stationary longitudinal rod or bar located under the fixed rear part of the roof extends through a housing mounted on the panel at its rear end, and oppositely acting locking means in the housing co-operating with the rod or bar are released simultaneously by means of a longitudinal strip of equivalent transmission member from a finger-operating control mounted in the panel at or adjacent to its forward end for limited movement in a fore and aft direction.

In the embodiment described in our U.S. Pat. No. 1,030,736 the oppositely acting locking means comprises a pair of spaced transverse locking members provided with openings through which the rod or bar passes and the locking members are normally urged towards each other to lock onto the rod or bar by resilient blades or spring members secured to one end of each locking member and a flange on a corresponding side of the housing. The locking members are actuated simultaneously, that is to say they are moved away from each other into positions at right angles to the rod or bar, by spaced lugs on a pivoted actuating member coupled to the longitudinal strip or equivalent transmission member, so that the rod or bar is allowed to pass freely through the openings on the locking member. The actuating member is biased either directly by a spring, or indirectly through a spring-loaded cam member, which normally holds it in a position in which both locking members are locked onto the rod or bar, and the actuating member is located in a central neutral position.

The object of our present invention is to provide an improved and simplified means for actuating a sliding roof of the kind set forth and for locking it in any desired position.

According to our present invention, in a sliding roof of the kind set forth a stationary longitudinal rod or bar located under the fixed rear part of the roof extends through a housing mounted on the panel at its rear end, and a pair of transverse locking members mounted in the housing and restrained at one pair of adjacent ends against movement with respect to the housing by abutment means in the housing are provided with openings through which the rod or bar is passed, at least portions of the locking members containing the openings normally being urged resiliently into operative positions in which they are oppositely inclined with respect to, and lock onto, the rod or bar to prevent relative movement of the panel with respect to the rod or bar only in each of two opposite directions, and a longitudinal strip or equivalent transmission member guided in the housing for relative limited longitudinal movement in a fore and aft direction in response to corresponding movement of a finger-operated control mounted in the panel at or adjacent to its forward end is provided with longitudinally spaced lugs for alternate engagement with the locking members whereby one of the locking members is adapted to pivot about the abutment means into a position substantially at right angles to the rod or bar to permit the rod or bar to pass freely through the opening in at least the said one locking member.

To open the roof from the closed position the control is simply engaged by the fingers and pushed rearwardly. The control first moves rearwardly relative to the panel to release the locking member which acts to prevent relative movement of the panel with respect to the rod or bar in that direction. Thereafter the control takes the panel rearwardly into the open or any intermediate position with the rod or bar sliding freely through the opening in the released locking member and through the opening in the other locking member which normally locks onto the rod or bar to prevent movement relative thereto in the opposite direction. Upon release of the control the previously released locking member automatically locks onto the rod or bar under the influence of its resilient loading.

To close the roof the control is simply moved forward to release the said other locking member and then to take the panel forwardly into the closed position.

A preferred construction of sliding roof in accordance with our invention is illustrated by way of example in the accompanying drawings in which.

Figure 1:
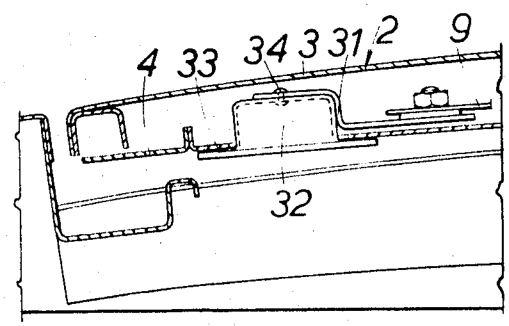
FIG. 1 is a longitudinal section of the forward portion of the roof in the closed position showing the forward portion of the sliding panel and the finger-operated control rod.
Figure 2:
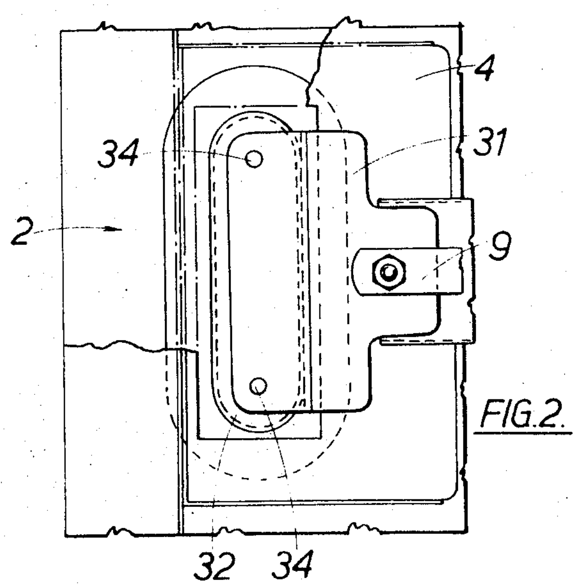
FIG. 2 is a plan view of FIG. 1 with part of the outer covering of the panel removed and a part of the forward portion of the roof broken away.
Figure 3:
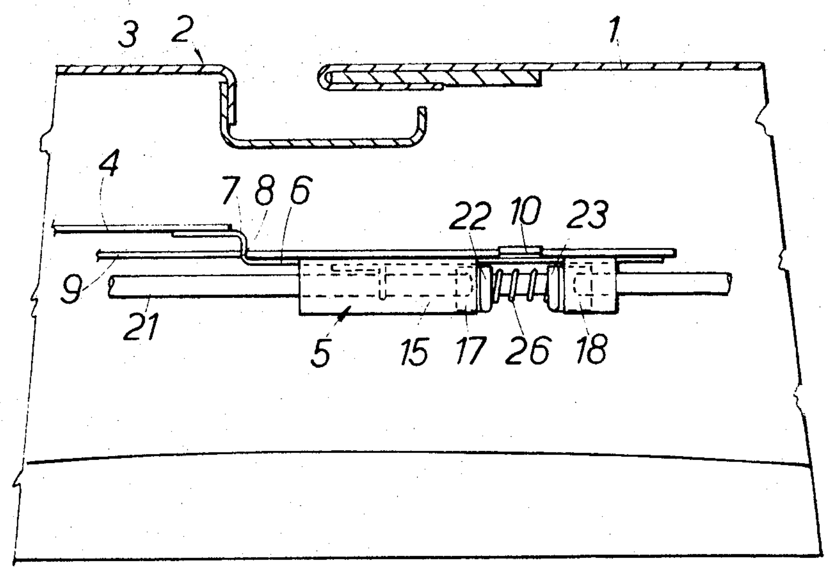
FIG. 3 is a longitudinal section of a part of the rear portion of the rod or bar showing the rear portion of the sliding panel and its locking means.
Figure 4:
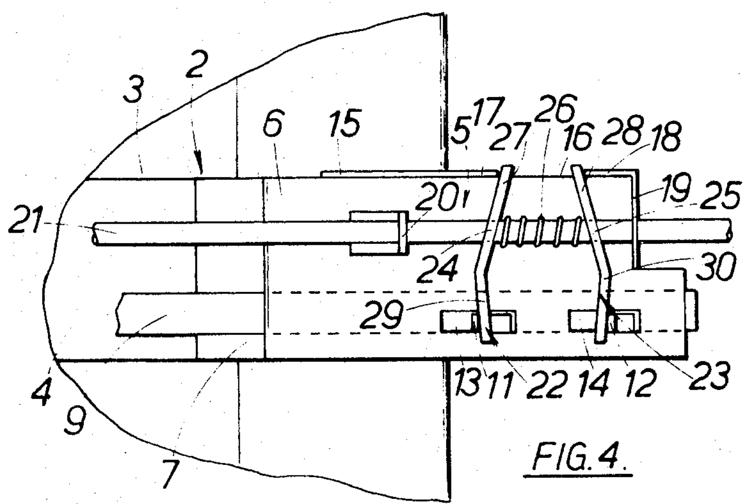
FIG. 4 is an inverted plan view of FIG. 3.

In the construction illustrated in the accompanying drawings, 1 is the fixed rear part or canopy of a vehicle roof and 2 is a longitudinally slidable panel adapted to close an opening in the front part of the roof. The panel 2 comprises an outer sheet metal pressing 3 conforming generally to the contour of the roof and is mounted on a trim frame 4 slidably guided in a known manner by means of felt-lined sliders or the like on flanges of a watercheck frame extending longitudinally along each side of an opening in the front part of the vehicle roof.

The panel 2 is detachably engaged at its front end with the trim frame and is free to move vertically at its rear end, the panel co-operating in a known manner with ramps in the watercheck frame which raise the rear edge of the panel into a position flush with the rear portion 1 of the roof as the panel reaches the closed position and allows it to drop and slide under the fixed rear portion when the panel is moved rearwardly away from the closed position.

A housing 5 is mounted below the trim frame at its rear end. The housing 5 comprises a base plate 6 provided at its forward end with an upwardly joggled portion 7 which is apertured at 8 adjacent to one edge of the plate 6 to define a guide for a strip or transmission member 9 which slides over the top face of the plate and is also guided for movement in a straight line parallel with the axis of the roof through an opening defined between a guide strip 10 and the plate 6 to which the guide strip is secured. At its inner end remote from the forward end of the panel 2 the strip or transmission member 9 is provided with a pair of longitudinally spaced downwardly directed lugs 11 and 12 which project through complementary spaced elongated openings 13 and 14 in the plate 6.

The side of the plate 6 remote from the strip 9 is provided with a downwardly directed flange 15 which is apertured at an intermediate point in its length at 16. Adjacent ends of the flange at opposite ends of the aperture 16 define a pair of abutment plates 17, 18 of which adjacent ends are spaced from each other by a distance less than the distance between the elongated openings 13,14 in the plate 6 with the ends of the abutment plates 17,18 being spaced by equal distances from adjacent ends of the elongated openings 13, 14.

The inner end of the plate 6 is provided with a downwardly directed flange 19 having an opening aligned with a complementary opening in a downwardly projected lug 20 secured to the plate at an intermediate point in its length. A rod or bar 21 is guided in the openings in the flange 19 and the lug 20 in a position parallel with the longitudinal axis of the roof.

A pair of transverse locking members 22,23 comprising rigid metal strips each engage at one end with an abutment defined by the free end of one of the abutment plates 17, 18 and about which that locking member is adapted to pivot. The locking members are provided at intermediate points to their lengths with aligned openings 24, 25 through which the portions of the rod or bar between the lug 20 and the flange 19 is received. A helical compression spring 26 surrounding the rod or bar acts at opposite ends on the locking members 22,23 to urge them away from each other into positions in which they diverge away from the abutments and are both locked onto the rod or bar with the wall of the openings 24, 25 in the locking members engaging with the surface thereof, each locking member preventing movement between the panel 2 and the rod or bar 21 in one direction. In that position the lugs 11 and 12 on the strip or transmission member 9 are spaced from the outer surfaces of the locking members 22 and 23.

Preferably the openings 24, 25 in the locking members are located at intermediate points in the lengths of divergent portions 27, 28 which lead into parallel portions 29, 30 directed towards the side of the plate remote from the abutments at least when the locking members are locked onto the rod or bar.

The forward free end of the strip or transmission member 9 is bolted to a cranked plate 31, which plate forms a support for a sheet metal pressing 32 of shallow inverted box form which is recessed into an opening 33 in the forward end of the trim frame 4. The pressing 32 forms a finger-operable control for the locking members 22 and 23 and is secured to the plate 31 by a pair of spaced rivets 34. The pressing 32 is slightly smaller than the opening 33 so that it is permitted a limited fore and aft movement relative to the panel.

When the roof is to be opened initial movement of the control 32 in a rearward direction in response to a manual force urges the lug 11 on the strip 9 adjacent to the joggled end of the plate 6 into engagement with the locking member 22 at that end of the plate which pivots about its abutment 17 against the spring loading 26. Thus, that locking member 22 is released from engagement with the rod 21 and is moved into a position in which the divergent portion 27 is substantially at right angles to the rod 21. Further movement of the control 32 in the same direction moves the panel 2 rearwardly and the rod or bar 21 slides relative to the released locking member 22. Since the other locking member only acts to prevent movement in the opposite direction the rod or bar 21 also slides through the locking member 23 without resistance. On release of the released locking member 22 that member again locks onto the rod or bar 21 due to the loading in the compression spring 26 so that the panel 2 is locked automatically in the fully open or any desired intermediate open position.

To close the roof, the sequence described above is reversed with the other locking member 23 remote from the joggled end of the plate being released by the engagement therewith of the other lug 12 on the strip or transmission member 9.

What we claim is:

1. A sliding roof for a vehicle comprising a longitudinally slidable panel for closing an opening in the front part of the vehicle roof, said panel having a forward end and a rear end and being slidably movable between an open position in which the panel is located under the fixed rear part of the roof and a closed position in which the panel is flush with the surface of the roof, a housing mounted on said rear end of said panel, a stationary longitudinal rod located under said fixed rear part of said roof and extending through said housing, a pair of transverse locking members mounted in said housing and provided with openings through which said rod is passed, abutment means in said housing for restraining movement of one pair of adjacent ends of said locking members with respect to said housing, resilient means for urging at least portions of said locking members containing said openings to operative positions in which said locking members are oppositely inclined with respect to, and lock onto, said rod to prevent relative movement of said panel with respect to said rod only in each of two opposite directions, a finger-operated control mounted in said panel adjacent said forward end, a longitudinal transmission member guided in said housing for limited longitudinal movement in a fore and aft direction in response to corresponding movement of said finger-operated control, and a pair of longitudinally spaced lugs on said transmission member for alternate engagement with said locking members of which each lug is adapted to engage with a corresponding one of said locking members in response to longitudinal movement of said transmission member in a corresponding direction to cause that locking member to pivot about said abutment means into a position substantially at right angles to said rod to permit said rod to pass freely through said opening in at least the said one locking member.

2. A sliding roof as claimed in claim 1, incorporating a compression spring surrounding a portion of said rod between said locking members to urge said locking members away from each other into said operative positions.

3. A sliding roof as claimed in claim 1, wherein said locking members incorporate portions which diverge from said abutment means, at least when said locking members are locked on to said bar, and said openings are located in said portions which diverge from said abutment means.

4. A sliding roof as claimed in claim 3, wherein the ends of said divergent portions remote from said abutment means lead into second portions, said second portions being substantially parallel when said locking members are locked onto said rod, wherein said lugs are engageable alternately with outer faces of said second portions.

* * * * *